(12) United States Patent
Liu et al.

(10) Patent No.: US 12,422,590 B2
(45) Date of Patent: Sep. 23, 2025

(54) METASURFACE FOR FAR-FIELD BEAM CHARACTERISTIC CONTROL OF MICRO LIGHT EMITTING DIODES

(71) Applicant: Meta Platforms Technologies, LLC, Menlo Park, CA (US)

(72) Inventors: Zhaocheng Liu, Redmond, WA (US); Zhaoyu Nie, Kenmore, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 489 days.

(21) Appl. No.: 18/073,849

(22) Filed: Dec. 2, 2022

(65) Prior Publication Data

US 2024/0012176 A1  Jan. 11, 2024

Related U.S. Application Data

(60) Provisional application No. 63/388,200, filed on Jul. 11, 2022.

(51) Int. Cl.
    *G02B 1/00* (2006.01)
(52) U.S. Cl.
    CPC ........ *G02B 1/002* (2013.01); *G02B 2207/101* (2013.01)
(58) Field of Classification Search
    CPC .................. G02B 1/002; G02B 2207/101
    See application file for complete search history.

(56) References Cited

U.S. PATENT DOCUMENTS

| | | | |
|---|---|---|---|
| 10,804,431 B2 | 10/2020 | Chang | |
| 2017/0287151 A1* | 10/2017 | Han | G02B 1/002 |
| 2018/0172988 A1* | 6/2018 | Ahmed | G06T 11/00 |
| 2020/0166783 A1 | 5/2020 | Roy et al. | |
| 2022/0123185 A1* | 4/2022 | West | H10H 20/83 |

OTHER PUBLICATIONS

He S., et al., "Computing Metasurfaces for All-Optical Image Processing: A Brief Review," Nanophotonics, Feb. 24, 2022, vol. 11, No. 6, pp. 1083-1108.
Malkiel I., et al., "Plasmonic Nanostructure Design and Characterization via Deep Learning," Light: Science & Applications, Sep. 5, 2018, vol. 7, No. 60, 8 pages.
Pattison M., et al., "2022 Solid-State Lighting R&D Opportunities," U.S. Department of Energy, Feb. 2, 2022, (Relevant parts: p. 101, and Section 3.2.3.3, Pars. 1 & 3), 201 pages.

* cited by examiner

*Primary Examiner* — Mariam Qureshi
(74) *Attorney, Agent, or Firm* — Greenberg Traurig, LLP

(57) ABSTRACT

A far-field characteristic of light emitted by a micro light emitting diode (μLED) such as a beam shape, a beam orientation, a beam focusing, or a beam polarization is controlled by a metasurface of nanostructures formed on the μLED. The metasurface is characterized or defined by a far-field objective function for the emitted light, selection of a nanostructure shape, and application of one or more fabrication constraints to shape parameters for the selected nanostructure shape. A number and a location of the nanostructures is determined employing an adjoint simulation technique, and the shape parameters for the nanostructure are tuned employing a shape optimization technique.

20 Claims, 6 Drawing Sheets

METASURFACE FOR FAR-FIELD BEAM CHARACTERISTIC CONTROL OF MICRO LIGHT EMITTING DIODES

CROSS REFERENCE TO RELATED APPLICATIONS

This patent application claims the benefit of U.S. Provisional Patent Application Ser. No. 63/388,200 filed on Jul. 11, 2022. The disclosures of the above application are hereby incorporated by reference for all purposes.

TECHNICAL FIELD

This patent application relates generally to control of emitted light from light emitting diodes (LEDs) of a display system, and more specifically, to coating a surface of a micro light emitting diodes (μLEDs) with nanostructures to manipulate a beam profile, directionality, and/or polarization of emitted light to increase coupling efficiency.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers. Virtual reality (VR) content, augmented reality (AR) content, or mixed reality (MR) content may be presented through near-eye display devices such as head-mounted displays (HMDs), smart glasses, and similar ones. While providing advantages such as portability, handsfree assistance, etc., near-eye display devices may have a number of challenges such as image coloring, resolution, and brightness.

In virtual reality (VR), augmented reality (AR), or mixed reality (MR) display systems, brightness is an important factor that determines the quality of the display in various lighting environments. Improving the efficiency of the light sources micro light emitting diodes (μLEDs) coupled to the waveguide system is one of the techniques for increasing the overall brightness. The radiated and collimated light from micro light emitting diodes (μLEDs) typically has a Gaussian transverse beam profile, which is not optimal for coupling efficiency. Covering a portion of the radiated light may result in about 40% loss of the light.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
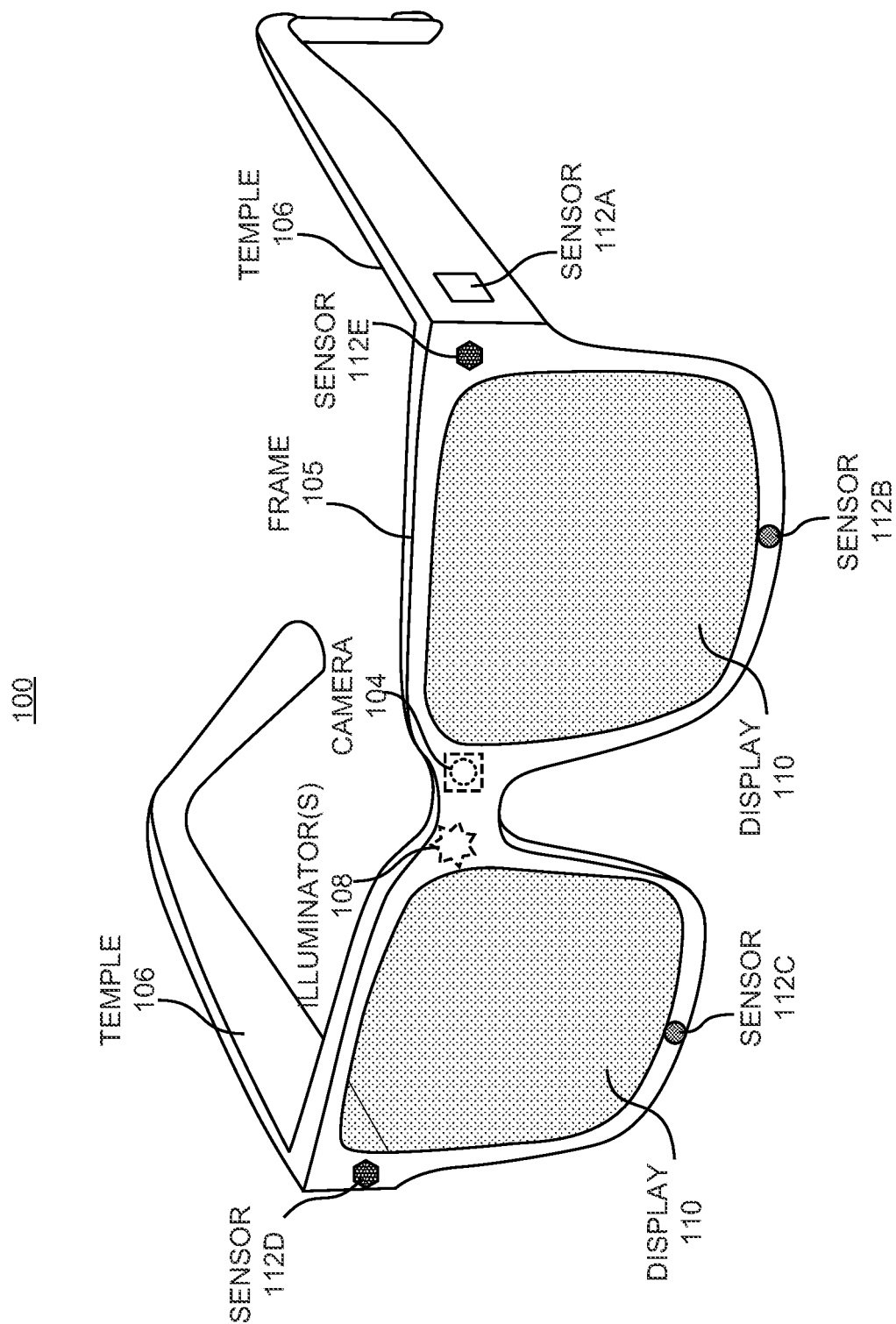
FIG. 1 illustrates a perspective view of a near-eye display in form of a pair of augmented reality (AR) glasses, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

As used herein, a "near-eye display" may refer to any display device (e.g., an optical device) that may be in close proximity to a user's eye. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein, a "user" may refer to a user or wearer of a "near-eye display."

Some near-eye display devices may include displays or projectors that use micro light emitting diodes (μLEDs) as light source, where light from the micro light emitting diode (μLED) is coupled to a waveguide. A transverse beam profile of the radiated and collimated light from the micro light emitting diode (μLED) may be not optimal for coupling efficiency. Conventional approaches such as covering a portion of the radiated light may result in substantial loss of the light. On the other hand, performing beam shaping directly at the source side by introducing a metasurface on the micro light emitting diode (μLED) may increase an overall system efficiency. Furthermore, characteristics of the emitted light such as focusing, polarization, etc. which may be used by various optical components of a near-eye display system to enhance image quality, mitigate aberrations, etc. may also be controlled at the micro light emitting diode (μLED) using the metasurface.

In some examples of the present disclosure, a far-field function (characteristic) of light emitted by a micro light emitting diode (μLED) such as a beam shape, a beam orientation, a beam focusing, or a beam polarization may be controlled by a metasurface of nanostructures formed on the micro light emitting diode (μLED). The metasurface may be characterized or defined by a far-field objective function for the emitted light, selection of a nanostructure shape, and application of one or more fabrication constraints to shape parameters for the selected nanostructure shape. A number and a location of the nanostructures may be determined employing an adjoint simulation technique, and the shape parameters for the nanostructure may be tuned employing a shape optimization technique. Nanostructure shapes may include, but are not limited to, a square prism, a rectangular prism, a cylinder, an irregular prism, and/or other similar shapes.

In some examples, a Bayesian analysis search may be performed to reduce a number of candidate nanostructures with respective shape parameters and results of the Bayesian analysis may be used as inputs to the adjoint simulation technique. The shape parameters may include a number of nanostructures to form the metasurface, a location each nanostructure, a footprint of each nanostructure, a width of each nanostructure, a length of each nanostructure, and/or a height of each nanostructure. The adjoint simulation technique may determine a center and a shape of each nanostructure based on a reverse simulation from the far-field objective function and determine a gradient for each nanostructure.

Accordingly, multiple parameters of nanostructures to form a metasurface on a micro light emitting diode (μLED) may be identified and selected for a designated far-field characteristic of light emitted by the micro light emitting diode (μLED) through a combination of search and optimization techniques iteratively and efficiently. The described techniques may reduce needed computing resources and computing time, and increase a brightness efficiency in a display system by reducing loss due to in-coupling with a waveguide. Other benefits and advantages may also be apparent.

FIG. 1 illustrates a perspective view of a near-eye display in form of a pair of augmented reality (AR) glasses, according to an example. In some examples, the near-eye display 100 may be an implementation of a wearable device, specifically, a head-mounted display (HMD) device configured to operate as a virtual reality (VR) display, an augmented reality (AR) display, and/or a mixed reality (MR) display.

In some examples, the near-eye display 100 may include a frame 105, temples 106, and a display 110. The display 110 may be configured to present media or other content to a user and may include display electronics and/or display optics. For example, the display 110 may include a transparent liquid crystal display (LCD) display panel, a transparent light-emitting diode (LED) display panel, or a transparent optical display panel (e.g., a waveguide display assembly). The display 110 may also be semi-transparent or non-transparent. In case of non-transparent display, a view of the external environments may be captured by a dual performance camera 104, processed, and provided to the user (wearer of the near-eye display 100) with or without superimposition with virtual content. Other optical components may include waveguides, gratings, lenses, mirrors, etc. Electrical components may include sensors 112A-112E, the dual performance camera 104, illuminator(s) 108, etc. In some examples, the temples 106 may include embedded battery (ies) (not shown) to power the electrical components.

In some examples, the various sensors 112A-112E may include any number of depth sensors, motion sensors, position sensors, inertial sensors, and/or ambient light sensors, as shown. In some examples, the various sensors 112A-112E may include any number of image sensors configured to generate image data representing different fields of views in one or more different directions. In some examples, the various sensors 112A-112E may be used as input devices to control or influence the displayed content of the near-eye display 100, and/or to provide an interactive virtual reality (VR), augmented reality (AR), and/or mixed reality (MR) experience to a user of the near-eye display 100. In some examples, the various sensors 112A-112E may also be used for stereoscopic imaging or other similar application. A virtual reality engine (implemented on the near-eye display 100 or on another computing device and wirelessly coupled to the near-eye display 100) may execute applications within the near-eye display 100 and receive depth information, position information, acceleration information, velocity information, predicted future positions, or any combination thereof of the near-eye display 100 from the various sensors 112A-112E.

In some examples, the display 110 or similar projector(s) may be used to present content to a wearer of the near-eye display 100. In virtual reality (VR) applications, but even more importantly in augmented reality (AR) or mixed reality (MR) applications, brightness of the displayed content is an important success parameter for near-eye displays. Due to size, weight, power, etc. limitations, achieving satisfactory brightness of the display is a challenge for near-eye displays. Increasingly, micro light emitting diodes (μLEDs) are used as light source in near-eye displays for their size, weight, and power consumption characteristics. However, typical near-eye displays include other components such as waveguides that couple to the micro light emitting diodes (μLEDs). Inefficiencies in waveguide coupling due to direction and shape of light beam from the micro light emitting diodes (μLEDs) may result in loss of brightness in the display 110.

In some examples, captured images may be processed, for example, by a virtual reality engine (implemented on the near-eye display 100 or on another computing device and wirelessly coupled to the near-eye display 100) to add virtual objects to the captured images or modify physical objects in the captured images, and the processed images may be displayed to the user by the display 110 for augmented reality (AR) and/or mixed reality (MR) applications.

In some examples, the near-eye display 100 may be implemented in any suitable form-factor, in addition to the pair of glasses shown in the figure, such as a head-mounted display (HMD) or other similar wearable eyewear or device. The near-eye display 100 may also include (not shown) one or more eye-tracking systems. As used herein, "eye tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking system(s) may capture reflected radio waves emitted by a miniature radar unit. These data associated with the eye may be used to determine or predict eye position, orientation, movement, location, and/or gaze.

Functions described herein may be distributed among components of the near-eye display 100 in a different manner than is described here. Furthermore, a near-eye display as discussed herein may be implemented with additional or fewer components than shown in FIG. 1. While the near-eye display 100 is shown and described in form of glasses, beam shaping and/or polarization control through nanostructures on micro light emitting diodes (μLEDs) may be implemented in other forms of near-eye displays such as goggles or headsets, as well as in non-wearable display systems.

Figure 2:
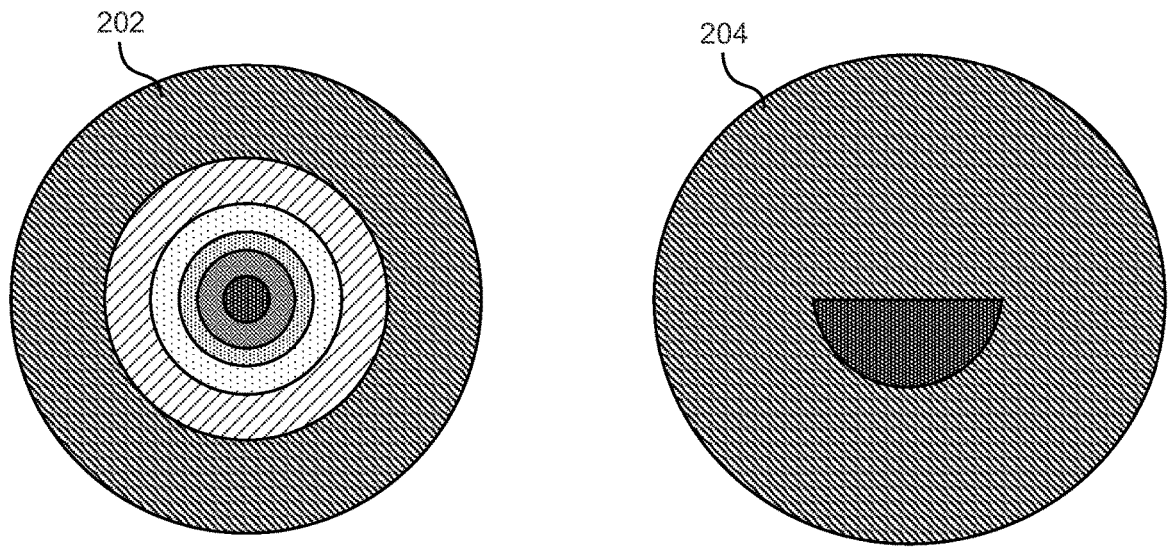
FIG. 2 illustrates a typical radiation profile in transverse direction, an asymmetric shape radiation profile, and an in-coupling waveguide that accepts a portion of the light, according to an example.
Figure 2:
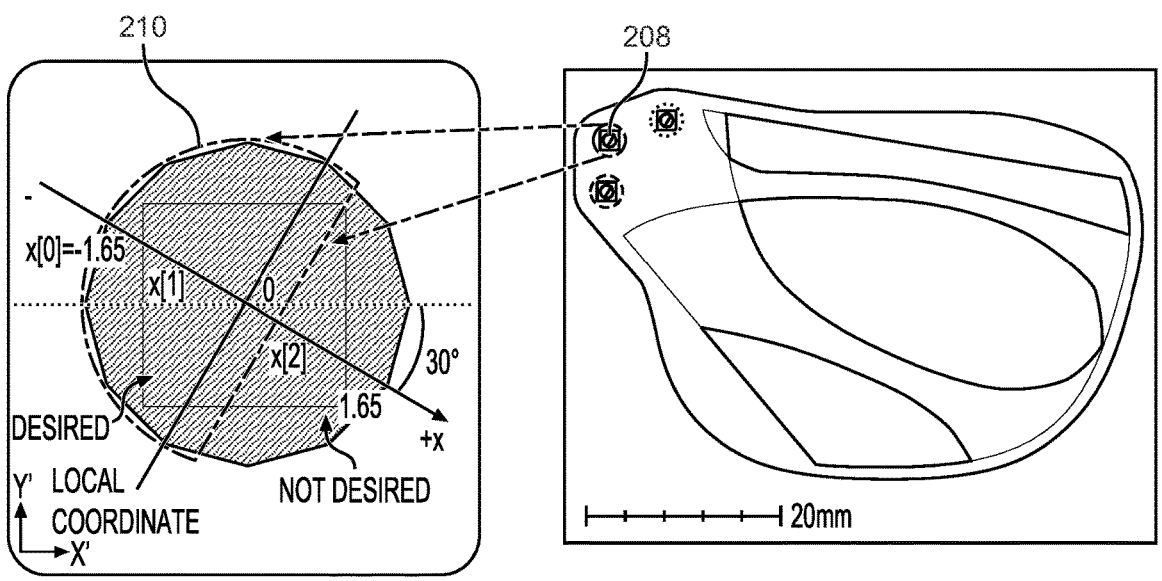

FIG. 2 illustrates a typical radiation profile in transverse direction, an asymmetric shape radiation profile, and an in-coupling waveguide 210 that accepts a portion of the light, according to an example. Diagram 200 shows a typical radiation profile 202 of a micro light emitting diode (μLED) in transverse direction, a designated radiation profile with an asymmetric shape 204, and the in-coupling waveguide 210 (red shaded area).

In order to improve the augmented reality (AR)/virtual reality (VR) device efficiency, a system level design and optimization may be useful. One potential aspect to improve overall efficiency may be an asymmetric beam for waveguide coupling. In an augmented reality (AR) display, three components are typically used to send light from the source to the waveguide: light source, collimating optics, and a waveguide coupler. The light radiated from the light source after collimating may have a gaussian transverse beam profile as shown in radiation profile 202. The light may be sent to the in-coupling waveguide 210, a set of surface relief grating to propagate and project to the eyebox. However, when the light is coupled into the waveguide and starts propagating via total internal reflection, the trapped light may retouch upon the in-coupler, which may then function as an out-coupler to diffract some light away from the waveguide.

Accordingly, the in-coupling waveguide may be designed as a half-circular shape on purpose, (red shaded area) in diagram 200. While this configuration may increase the overall efficiency, still about 40% of the light may be lost. If the beam shape of the micro light emitting diode (μLED) radiation can be modified to a half-circular or similar asymmetric shape, a majority of the wasted 40% of light may be saved. Such as beam shaping may be hard to achieve with collimating optics because large angle diffraction optics may be needed and increase the overall form factor by adding new components. In some examples, the beam shaping may be accomplished directly at the source by introducing a metasurface on top of a micro light emitting diode (μLED). With suitably selected nanostructures on the surface of the micro light emitting diode (μLED), the beam may be shaped towards an asymmetric profile 204. In addition to beam shape optimization, metasurface structures may be employed for other beam characteristics such as shaping radiation directionality, collimation, focusing, wavefront, polarization, etc.

Figure 3:
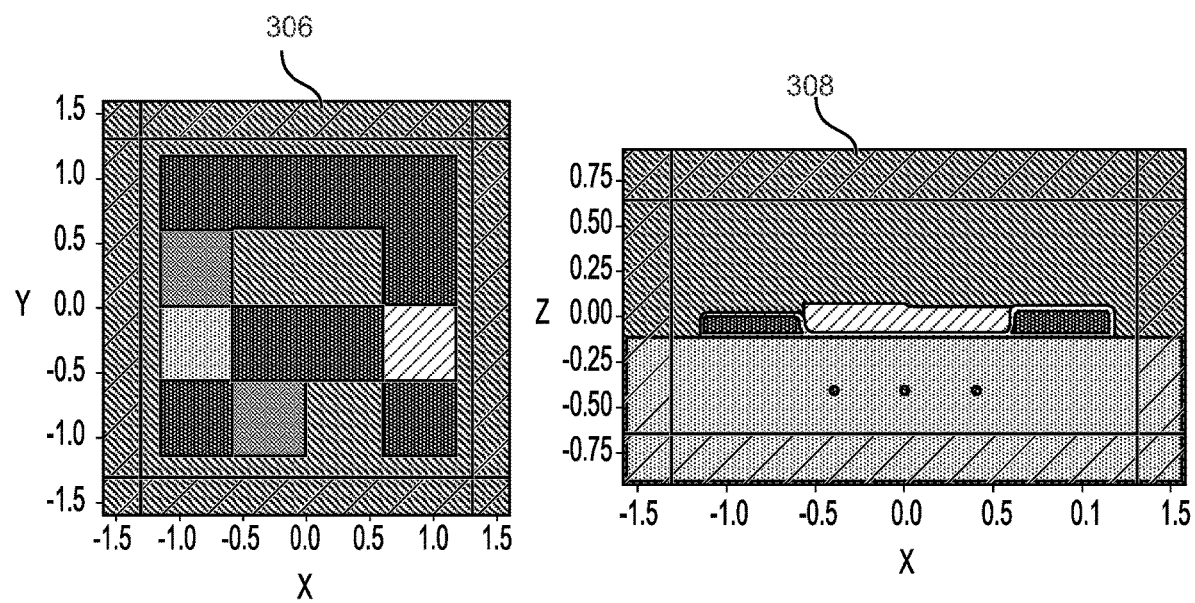
FIG. 3 illustrates implementation of metasurface with a top view of pixelated metasurface, a side view of pixelated metasurface, and a beam shape objective function and an optimized beam shape to match the beam shape objective function, according to an example.
Figure 3:
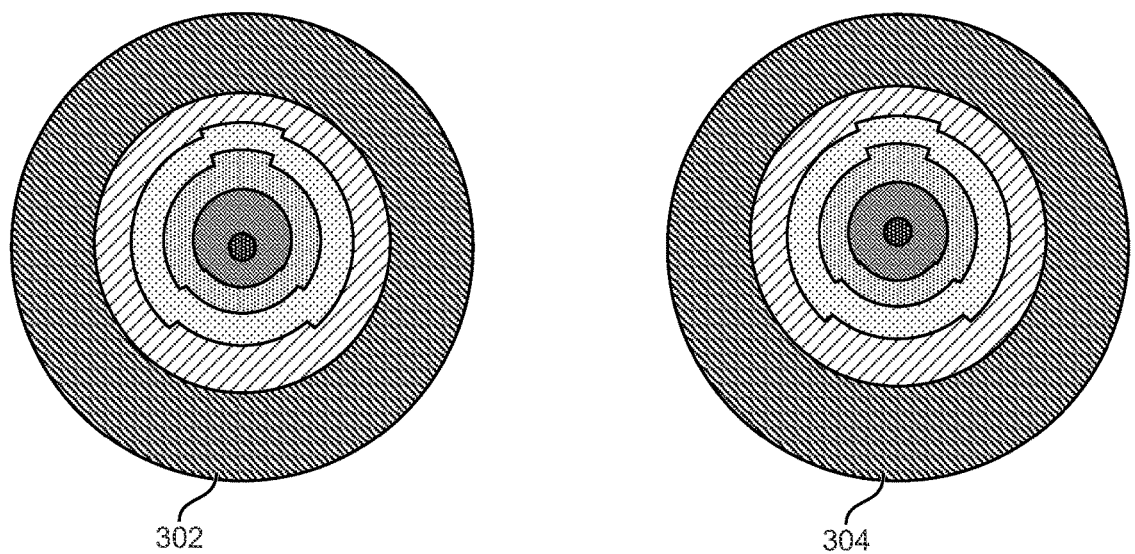

FIG. 3 illustrates implementation of metasurface with a top view of pixelated metasurface, a side view of pixelated metasurface, and a beam shape objective function and a designated beam shape to match the beam shape objective function, according to an example. Diagram 300 shows a beam shape objective function 302, for example, an asymmetric elliptical beam shape at a defined distance (e.g., 1 mm). The beam shape objective function 302 may be used to identify metastructures and their respective characteristics, for example, footprint, height, width, shape.

In some examples, the metasurface 306 may be defined as a square with individual nanostructures forming the pixels in the square. Different height (shape and/or footprint) nanostructures 308 may change a phase profile of the emitted light achieving the designated beam shape 304 to match the beam shape objective function 302. Bayesian analysis along with other algorithms may be employed to identify and shape the nanostructures.

Figure 4:
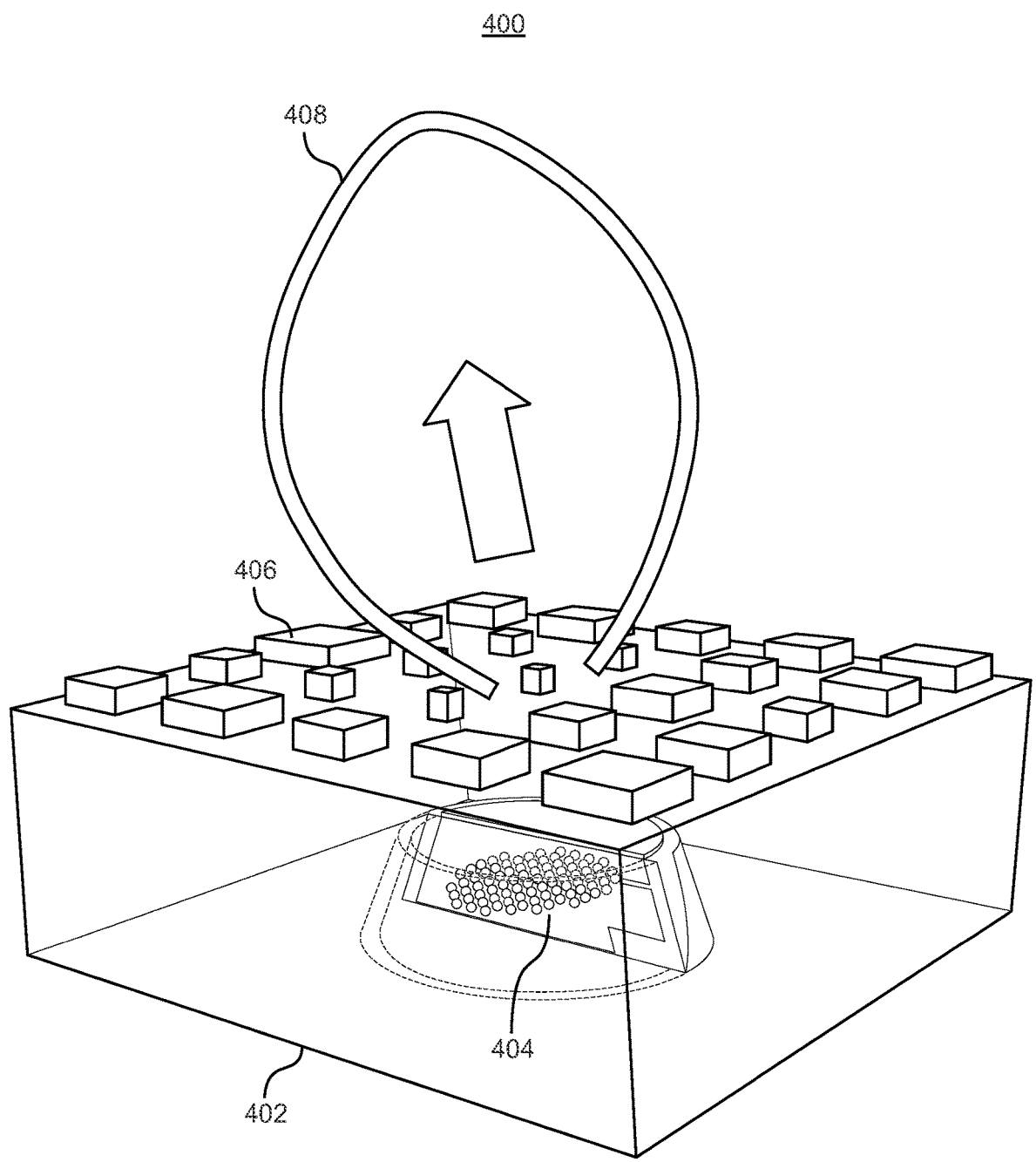
FIG. 4 illustrates a metasurface-on-μLED model with metasurface structure placed and shaped to achieve a far-field beam property objective function, according to an example.

FIG. 4 illustrates a metasurface-on-μLED model with metasurface structure placed and shaped to achieve a far-field beam property objective function, according to an example. Diagram 400 shows nanostructures 406 forming a metasurface on a substrate 402, which may also encompass micro light emitting diode (μLED) 404. The nanostructures 406 may change a beam profile of the emitted light to a designated beam profile 408. For example, a width of the beam and/or a direction of the beam may be modified to designated values for efficient coupling of the light to a waveguide.

In some examples, the beam shape objective function may be any designated far-field beam characteristic. Thus, a shape for each metasurface unit cell (nanostructure), a shape parameter to be defined, and a range for the shape parameter(s) may be needed. To achieve the beam shaping of a micro light emitting diode (μLED) structure, a layer (or a few layers) of nanostructures may be patterned. These structures may serve as a very small area (e.g., 1-3 μm$^2$) metasurface to steer the light propagation direction to a designated one. As shown in diagram 400, a coating with metasurface nanostructures may be added above the micro light emitting diode (μLED) emitter. The materials of the nanostructures include any suitable material such as silicon, graphene, $TiO_2$, etc. depending on the wavelengths of the emitted light. In some examples, the entire unit may have the size ranging from about 1 micrometer to about 5 micrometers. A number of the nanostructures may be in a range from about 10 to about 1000, for example, depending on the size of the micro light emitting diode (μLED) structure. It should be noted that the patterned metasurface may have arbitrary topologies.

Figure 5:
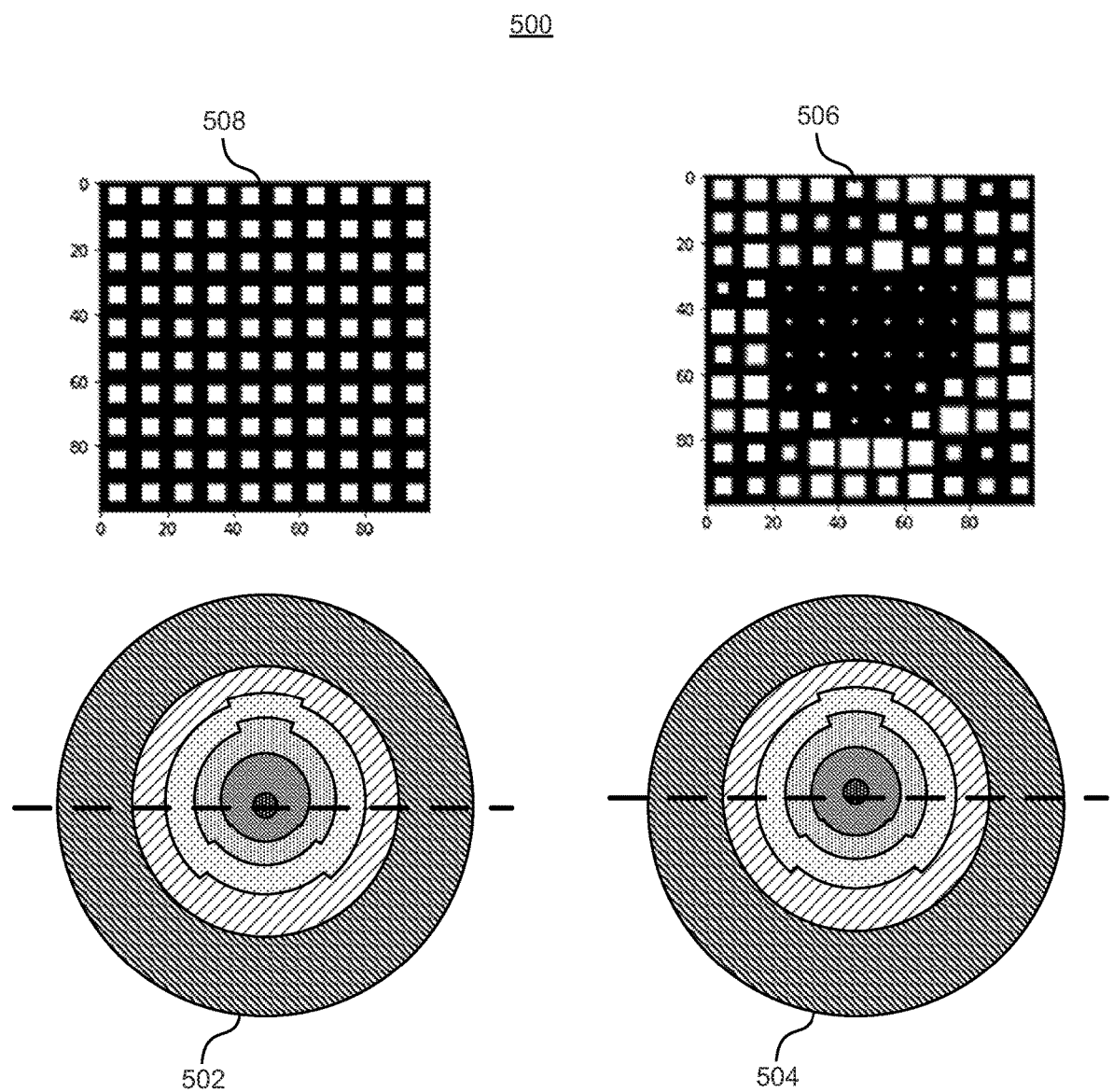
FIG. 5 illustrates adjoint simulation and shape optimization with metasurface initialization, determined metasurface towards half circular shaped beam shape, beam shape without metasurface, and asymmetric beam shape with metasurface, according to an example.

FIG. 5 illustrates adjoint simulation and shape optimization with metasurface initialization, determined metasurface towards half circular shaped beam shape, beam shape without metasurface, and asymmetric beam shape with metasurface, according to an example. Diagram 500 shows a beam shape 502 (transverse direction) without a metasurface, a half circular beam shape 504 with metasurface correction, an initial metasurface matrix 508, and a defined metasurface 506 to achieve the half circular beam shape 504.

Despite the straightforward patterning structure, it may be very challenging to design a metasurface on the micro light emitting diode (μLED) with designated functionality (achieving defined beam profile) due to the extremely small dimensions of the metasurface, compared to traditional meta-devices like meta-lens, for example. Due to the very small area, the metasurface may not be designed in a bottom-up manner, that is, finding the suitable phase and/or amplitude of the nanostructure at each location given the responses. Because of the large number of design parameters, traditional optimization techniques such as exhaustive search and Bayesian analysis alone may not be practical.

In some examples, a combination of adjoint simulation and shape optimization may be used to identify and select nanostructures and their parameters for the metasurface. Conventional optimization techniques may take very long computing times (e.g., months) to complete selection of nanostructure parameters in a metasurface as described herein, that is, if they converge. A combined technique according to examples may enable fast definition of the structure within days or a few hours regardless of a number of design parameters.

In the asymmetric beam shaping example of diagram 500, a 3×3×3 μm$^3$ simulation volume may be defined. 10×10 metasurface unit cells, or nanostructures (total 100 design parameters), are on a top surface of a micro light emitting diode (µLED). The metasurface unit cell may be predetermined to be an extruded square with width as the shape parameter to be defined. In each simulation and iteration, a shape of the radiation profile may be evaluated at 1 mm away (forward simulation) and an adjoint source placed in the designated shape may be used (adjoint simulation) to find the gradient for optimization. The structure may be initialized (508) with the same width. After optimizing towards an asymmetric shape 204 (e.g., half circular shape) in FIG. 2, with a number of (e.g., 30) iterations, the half circular beam shape 504 may be achieved. In the metasurface 506, the small dots in the middle indicate squares with zero width. With the asymmetric beam shape more than 75% of the optical energy may go through the lower section of the emitting region.

While a square shaped metasurface with square footprint nanostructures is shown in the example implementation in FIG. 5 (and FIG. 3), the metasurface, as well as the nanostructures may have any shape and/or dimensions. As mentioned herein, radiation directionality, collimation, focusing, wavefront, polarization, or similar beam characteristics may be modified and/or defined through selection of location, number, footprint, height, width, shape, or similar characteristics of the nanostructures.

In some examples, a center and/or a shape of each nanostructure may be defined, then dimensions (e.g., width, length, or height) may be tuned. As mentioned herein, a combination of adjoint simulation and shape optimization techniques may provide an efficient approach to define the nanostructures. A combination of adjoint simulation and shape optimization produces the gradients of the design parameters with respect to the figure of merit (FOM). The figure of merit (FOM) may be any parameter related to emitting direction, polarization, etc. Using the gradients, the dimensions and/or parameters of the metastructure may be updated to iteratively increase the figure of merit (FOM). The adjoint simulation provides the E-field used to calculate the gradients of the permittivity, and shape optimization helps determine the gradients of design parameters from the gradients of the permittivity. With the combination, the gradients of the design parameters with regard to the figure of merit (FOM) may be computed. Topology selection may provide similar results. In other words, the adjoint simulation may provide a gradient of gray scale of the metastructure. The combination approach utilizes the gradient to find the nanostructure shapes (with dimension parameters).

In some examples, the combination of adjoint simulation and shape optimization techniques may determine the shape of the nanostructures by using parallel computing for incoherent or partial spatial coherent micro light emitting diode (µLED) models within a Message Passing Interface (MPI). Parametric sweeping and Bayesian analysis are a couple other examples techniques that may be used to identify and define the nanostructures. However, parametric sweeping is limited to a few (e.g., 1-5) structures due to large computing resource needs. Bayesian analysis may provide global search and explore solution space. Bayesian analysis may also be artificial intelligence (learning algorithms) assisted and be very efficient in searching. However, this technique may not handle many parameters and may fail when the objective function is too sensitive. The adjoint simulation and shape optimization combination, on the other hand, utilizes gradient based selection and may handle a large degree of freedom. Through shape optimization, fabricable structures may be identified. In some implementation examples, the Bayesian analysis may handle 5-10 parameters, while adjoint simulation and shape optimization technique may handle 10-1000 parameters within reasonable computing time (e.g., a few hours to a few days) especially using parallel computing.

The adjoint simulation, as discussed above, may determine an E-field of emitted light (actual source) and provide as output structures based on the reverse simulation for a designated E-field (beam shape, polarization, etc.). In implementing shape optimization, PyTorch may be used. PyTorch is an optimized deep learning tensor library mainly used for applications using graphical processing units (GPUs) and central processing units (CPUs). PyTorch uses a technique called automatic differentiation, where a recorder may record which operations have performed and then replay the performed operations backward to compute the gradients. This may be used in building neural networks to save time on one epoch by computing differentiation of the parameters at the forward pass.

Figure 6:
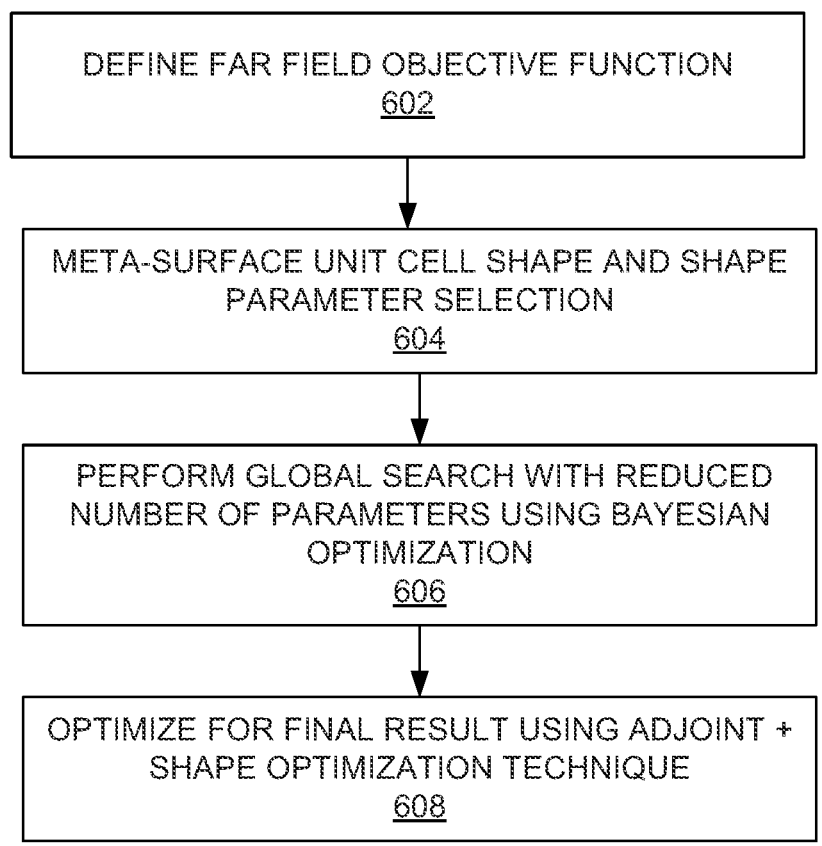
FIG. 6 illustrates a flowchart of a method for coating a surface of a micro light emitting diode (μLED) structure with nanostructures to manipulate a beam profile, according to an example.

FIG. 6 illustrates a flowchart of a method for coating a surface of a micro light emitting diode (µLED) structure with nanostructures to manipulate a beam profile, according to an example. The method 600 is provided by way of example, as there may be a variety of ways to carry out the method described herein. Although the method 600 is primarily described as being performed to implement the model of FIG. 4, the method 600 may be executed or otherwise performed by one or more processing components of another system or a combination of systems to implement other models. Each block shown in FIG. 6 may further represent one or more processes, methods, or subroutines, and one or more of the blocks (e.g., the selection process) may include machine readable instructions stored on a non-transitory computer readable medium and executed by a processor or other type of processing circuit to perform one or more operations described herein.

At block 602, a far-field objective function may be defined. The far-field objective function may be based on selection of a beam shape, beam steering, beam focusing, polarization, or comparable characteristics of the emitted light beam. In some optional examples, a coherent vs. incoherent light simulation choice may be made prior to the definition of the far-field objective function. Characterization of metastructures may depend on a determination of scattering parameters like transmittance and reflectance. While, numerically, coherent plane wave scattering amplitudes for infinite periodic samples may be used, experimental measurements may involve scattering of possibly incoherent optical probes with finite-size illumination spots on finite sample surfaces, which may serve as a proxy for the true plane wave scattering amplitudes.

At block 604, a metasurface unit cell (nanostructure) shape selection may be made, and fabrication constraints may be applied to the shape parameters (e.g., dimensions, locations, number of nanostructures). The fabrication constraints may be retrieved from a data store, a look-up table, or similar storage. At block 606, Bayesian analysis may be used with reduced number of parameters to perform global search for different nanostructures (shapes and shape parameters).

At block 608, the results of the Bayesian analysis may be used as input for a combination of adjoint simulation and shape optimization technique to determine individual nanostructure locations and shape parameters based on reverse simulation (adjoint simulation) and select using the shape optimization technique (e.g., with PyTorch). The results may provide a metasurface structure that may be fabricated on the surface of a micro light emitting diode (μLED) to achieve the designated far-field objective function.

According to examples, a method of identifying and fabricating a metasurface for a μLED is described herein. A system of making the metasurface for a micro light emitting diode (μLED) is also described herein. A non-transitory computer-readable storage medium may have an executable stored thereon, which when executed instructs a processor to perform the methods described herein.

In the foregoing description, various inventive examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A system, comprising:
 a processor; and
 a memory storing processor-executable instructions that, when executed by the processor, cause the processor to:
  define a far-field objective function for light emitted by a micro light emitting diode (μLED),
  select a shape for a metasurface unit cell;
  determine one or more of a number or a location of metasurface unit cells with the selected shape employing an adjoint simulation technique; and
  select values of shape parameters for the metasurface unit cells employing a shape optimization technique.

2. The system of claim 1, wherein the memory stores further processor-executable instructions to:
 perform a Bayesian analysis-based search to reduce a number of candidate metasurface unit cells with respective shape parameters; and
 provide a result of the Bayesian analysis-based search as an input to the adjoint simulation technique.

3. The system of claim 1, wherein the memory stores further processor-executable instructions to:
 retrieve one or more fabrication constraints; and
 reduce a range of the values of the shape parameters based, at least in part, on the one or more fabrication constraints.

4. The system of claim 1, wherein the shape parameters comprise one or more of a number of nanostructures to form the metasurface, a location of each nanostructure, a footprint of each nanostructure, a width of each nanostructure, a length of each nanostructure, or a height of each nanostructure.

5. The system of claim 1, wherein the far-field objective function comprises one or more of a beam shape, a beam orientation, a beam focusing, or a beam polarization of the light emitted by the micro light emitting diode (μLED).

6. The system of claim 1, wherein the adjoint simulation technique comprises:
 determining at least one a center of a footprint of each metasurface unit cell or the shape of each metasurface unit cell based on a reverse simulation from the far-field objective function; and
 determining a gradient for each metasurface unit cell.

7. The system of claim 1, wherein the shape of the metasurface unit cell comprises a square prism, a rectangular prism, a cylinder, or an irregular prism.

8. A method comprising:
 defining a far-field objective function for light emitted by a micro light emitting diode (μLED),
 selecting a shape for a metasurface unit cell;
 determining one or more of a number or a location of metasurface unit cells with the selected shape employing an adjoint simulation technique; and
 selecting values of shape parameters for the metasurface unit cells employing a shape optimization technique.

9. The method of claim 8, further comprising:
 performing a Bayesian analysis-based search to reduce a number of candidate metasurface unit cells with respective shape parameters; and
 providing a result of the Bayesian analysis-based search as an input to the adjoint simulation technique.

10. The method of claim 8, further comprising:
 retrieving one or more fabrication constraints; and
 reducing a range of the values of the shape parameters based, at least in part, on the one or more fabrication constraints.

11. The method of claim 8, wherein the shape parameters comprise one or more of a number of nanostructures to form the metasurface, a location of each nanostructure, a footprint of each nanostructure, a width of each nanostructure, a length of each nanostructure, or a height of each nanostructure.

12. The method of claim 8, wherein the far-field objective function comprises one or more of a beam shape, a beam orientation, a beam focusing, or a beam polarization of the light emitted by the micro light emitting diode (μLED).

13. The method of claim 8, wherein the adjoint simulation technique comprises:
   determining one or more of a center of a footprint or the shape of each metasurface unit cell based on a reverse simulation from the far-field objective function; and
   determining a gradient for each metasurface unit cell.

14. The method of claim 8, wherein the shape of the metasurface unit cell comprises a square prism, a rectangular prism, a cylinder, or an irregular prism.

15. A metasurface for a micro light emitting diode (µLED), comprising:
   a substrate deposited on an emission surface of the micro light emitting diode (µLED), and
   a plurality of metasurface unit cells formed on the substrate, wherein the plurality of metasurface unit cells are formed by:
      definition of a far-field objective function for light emitted by the micro light emitting diode (µLED),
      selection of a shape for each metasurface unit cell;
      determination of one or more of a number or a location of metasurface unit cells with the selected shape employing an adjoint simulation technique; and
      selection of values of shape parameters for the metasurface unit cells employing a shape optimization technique.

16. The metasurface of claim 15, wherein
   a number of candidate metasurface unit cells with respective shape parameters is reduced through a Bayesian analysis-based search, and
   a result of the Bayesian analysis-based search is provided as an input to the adjoint simulation technique.

17. The metasurface of claim 15, wherein a range of the values of the shape parameters is reduced based, at least in part, on one or more fabrication constraints.

18. The metasurface of claim 15, wherein the shape parameters comprise one or more of a number of nanostructures to form the metasurface, a location of each nanostructure, a footprint of each nanostructure, a width of each nanostructure, a length of each nanostructure, or a height of each nanostructure.

19. The metasurface of claim 15, wherein the far-field objective function comprises one or more of a beam shape, a beam orientation, a beam focusing, or a beam polarization of the light emitted by the micro light emitting diode (µLED).

20. The metasurface of claim 15, wherein the shape of the metasurface unit cell comprises a square prism, a rectangular prism, a cylinder, or an irregular prism.

* * * * *